United States Patent [19]

Sakano

[11] Patent Number: 4,968,974
[45] Date of Patent: Nov. 6, 1990

[54] OBSERVATION APPARATUS FOR THE BEHAVIORAL OBSERVATION OF EXPERIMENTAL ANIMALS

[75] Inventor: Kazuhito Sakano, Toyama, Japan
[73] Assignee: Toyo Sangyo Kabushiki Kaisha, Toyama, Japan
[21] Appl. No.: 411,551
[22] Filed: Sep. 22, 1989

[30] Foreign Application Priority Data

Oct. 14, 1988 [JP] Japan .................. 63-258974

[51] Int. Cl.$^5$ .............. G08B 13/18; G08B 21/00
[52] U.S. Cl. ....................... 340/573; 119/15; 250/221; 340/556
[58] Field of Search .............. 340/573, 556, 557; 119/1, 15; 250/221

[56] References Cited

U.S. PATENT DOCUMENTS 3,803,571  4/1974  Luz .................................. 119/1
4,337,726  7/1982  Czekajewski et al. ............. 119/1
4,448,150  5/1984  Catsimpoolas .................... 119/15

FOREIGN PATENT DOCUMENTS 226752  4/1985  German Democratic Rep.

Primary Examiner—Glen R. Swann, III
Attorney, Agent, or Firm—Flynn, Thiel, Boutell & Tanis

[57] ABSTRACT

An observation apparatus comprises a transparent keeping cage having cylindrical outer and inner walls defining an annular keeping space therebetween, a group of circumferential position detectors, a group of standing action detectors, a group of inner peripheral position detectors, a group of outer peripheral position detectors, and a data processing unit for processing detection signals produced by the detectors to determine the actions of an experimental animal through the analysis of the detection signals produced by the detectors. The detectors of each group are arranged on a circle at equal angular arrangement. Four detectors each belonging to one of the four groups of detectors are arranged in a set on the same radius and driven simultaneously or sequentially, and the sets of the detectors are driven sequentially one at a time to avoid interference between the detectors. The data processing unit is simple and compact in construction and has amplifiers for each set of the detectors. The transparent keeping cage and its annular keeping space enables the natural, spontaneous movement of the experimental animal in a three-dimensional space.

2 Claims, 3 Drawing Sheets

OBSERVATION APPARATUS FOR THE BEHAVIORAL OBSERVATION OF EXPERIMENTAL ANIMALS

BACKGROUND OF THE INVENTION

1. Field of the Invention

The present invention relates to an observation apparatus for the behavioral observation of experimental animals, such as mice, rats or hamsters, employing optical sensors to measure the actions of the experimental animal.

2. Description of the Prior Art

Novel medical supplies and foodstuffs are under a legal obligation to undergo safety tests including long-term animal experiments. The behavioral observation of an experimental animal is one of the modes of animal experiments. Since the continuous visual observation of the actions of an experimental animal is impossible, the behavior of the experimental animal is monitored by optical sensors to determine the positions of the experimental animal, the data obtained by the optical sensors is analyzed logically and the behavior is represented by numerical data. As shown in FIG. 5, a conventional apparatus for the behavioral observation of an experimental animal comprises a cage 1 having the shape of a rectangular solid, and optical sensors arranged along the X-axis and the Y-axis, which are perpendicular to each other, to measure only the two-dimensional positions, the width and length of an experimental animal, i.e., a mouse M.

Catching the experimental animal only within a plane, this conventional observation apparatus is unable to detect peculiar standing actions and delicate actions, such as the swing motions of the head within the width Ya of the body, of the experimental animal. Furthermore, being unable to detect the three-dimensional actions of the experimental animal and detecting the actions of the tail and the body inclusively, the conventional observation apparatus is unable to provide detailed measured data.

Although an optical sensor may be arranged for three dimensional detection, increase in the number of the optical sensor inevitably increases the cost of the observation apparatus. Furthermore, if the space defined by the side walls of the cage is not extraordinarily large, the advancement of the experimental animal is limited by the side walls of the cage having the shape of a rectangular solid and hence the continuous movement of the experimental animal is restricted. Consequently, the arbitrary or spontaneous actions of the experimental animal are restricted and the experimental animal is obliged to act under physical restrictions, which deteriorates the accuracy of measured data.

SUMMARY OF THE INVENTION

Accordingly, it is an object of the present invention to provide an observation apparatus for the behavioral observation of experimental animals, capable of measuring the three-dimensional actions of an experimental animal without requiring an excessively large number of optical sensors, and employing a cage defining a limited keeping space having a special morphology capable of making the experimental animal move spontaneously and continuously as if the experimental animal is in an infinite space.

In one aspect of the present invention, an observation apparatus for the behavioral observation of experimental animals comprises a transparent keeping cage having cylindrical outer and inner walls defining an annular space therebetween, circumferential position detectors, standing action detectors, inner peripheral position detectors, and outer peripheral position detectors, characterized in that the light projecting elements of the circumferential position detectors and the standing action detectors are arranged either outside the outer wall of the keeping cage or inside the inner wall of the keeping cage, the light receiving elements of the circumferential detectors and the standing action detectors are arranged, respectively, opposite to the corresponding light projecting elements either inside the inner wall of the keeping cage or outside the outer wall of the keeping cage, the light projecting elements of the inner peripheral position detectors are arranged on a circle either over or under the keeping cage, the light receiving elements of the inner peripheral position detectors are arranged, respectively, opposite to the corresponding light projecting elements either under or over the keeping cage, the light projecting elements of the outer peripheral position detectors are arranged on a circle either over or under the keeping cage, and the light receiving elements of the outer peripheral position detectors are arranged, respectively, opposite to the corresponding light projecting elements either under or over the keeping cage.

The annular space provides an endless path for the circumferential movement of the experimental animal along the inner or outer wall of the keeping cage to enable the natural and spontaneous motions of the experimental animal. The transparent inner and outer walls define a path having a large apparent width and hence the experimental animal is not repressed psychologically.

The circumferential position detector detects the orientation of the experimental animal, the standing action detectors detect the standing actions of the experimental animal, the inner peripheral position detectors detect the positions of the experimental animal on the inner side of the path, and the outer peripheral position detectors detect the postions of the experimental animal on the outer side of the path, and one of the inner peripheral position detectors and the corresponding outer peripheral position detector detect the experimental animal simultaneously when the experimental animal is at a position between the inner and outer walls of the keeping cage, so that the movement of the experimental animal in a three-dimensional space can be detected.

The radial arrangement of the detectors, respectively, on circles enables the analysis of minute movement of the experimental animal by a computer system without requiring an excessively large number of detectors.

Thus, the observation apparatus of the present invention is simple and compact in construction, inexpensive, capable of continuously and minutely detecting the three-dimensional, natural, spontaneous actions of the experimental animal and capable of continuously obtaining highly reliable accurate data by using a comparatively small number of detectors.

The observation apparatus of the present invention is applicable to the following purposes.

1. Development of psychiatrical medicine
2. Behavioral measurement (daily and circadian behavior)
3. Study of senile dementia 4. Study of the time-dependent variation of effect of medicine 5. Study of instinct behaviors (sexual impulse and appetite)

6. Study of reactions to external stimulations

7. Examination of learning functions

8. Study of intellectual level

The above and other objects, features and advantages of the present invention will become more apparent from the following description taken in conjunction with the accompaying drawings.

DETAILED DESCRIPTION OF THE PREFERRED EMBODIMENT

Figure 1:
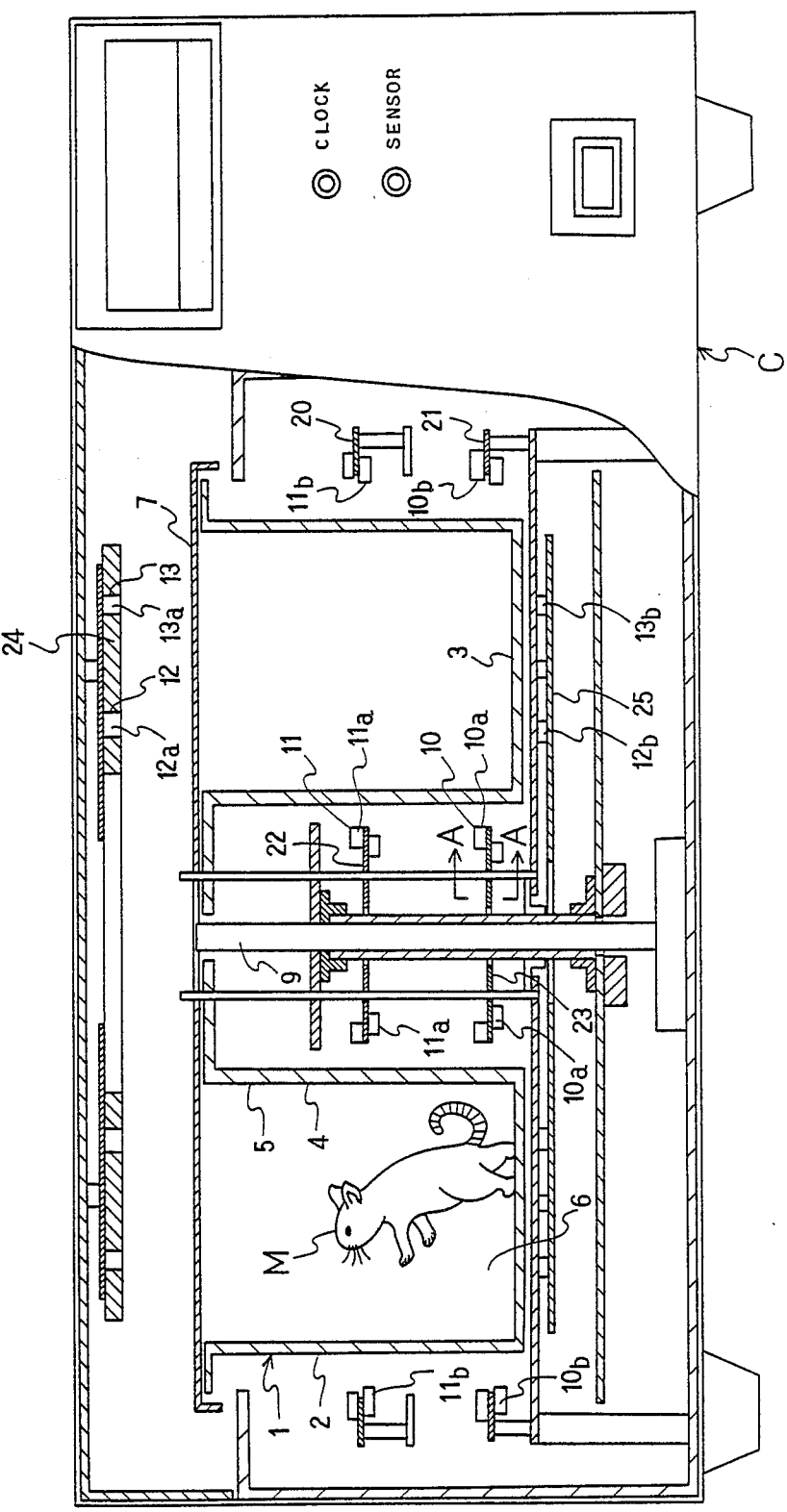
FIG. 1 is a partially sectional front elevation of an observation apparatus for the behavioral observation of experimental animals in a preferred embodiment according to the present invention.
Figure 2:
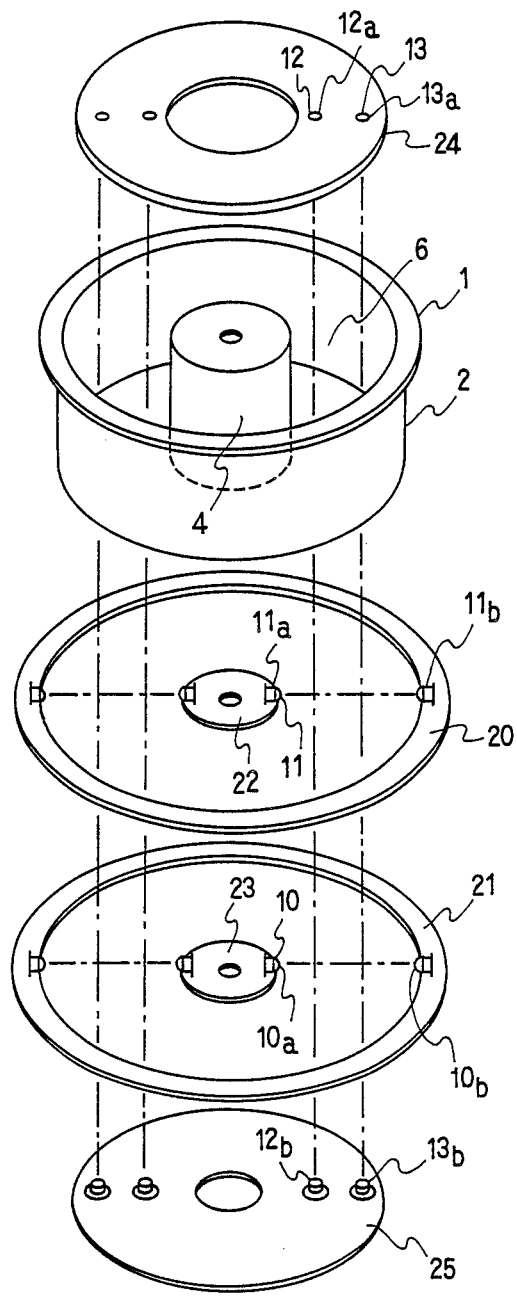
FIG. 2 is an exploded perspective view of a keeping cage employed in the observation apparatus of FIG. 1.
Figure 3:
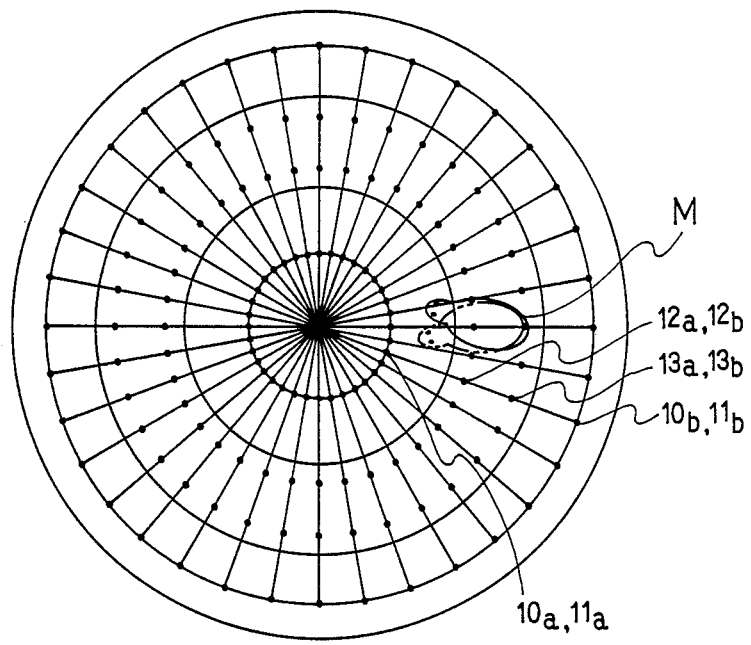
FIG. 3 is a diagrammatic plan view of assistance in explaining the arrangement of detectors.
Figure 4:
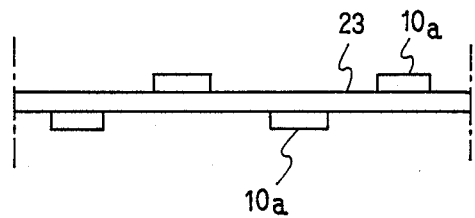
FIG. 4 is a fragmentary sectional view taken on line A-A in FIG. 1, showing the arrangement of detectors.
Figure 5:
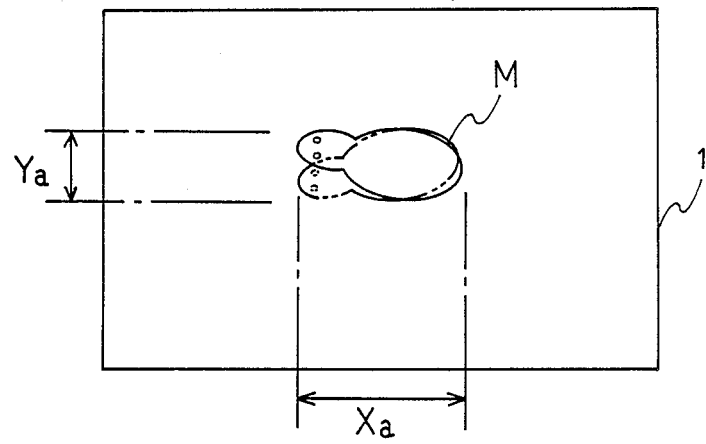
FIG. 5 is a diagrammatic illustration of assistance in explaining a conventional observation apparatus for the behavioral observation of experimental animals.

Referring to FIGS. 1 and 2, an observation apparatus embodying the present invention has a keeping cage 1 accommodated in a case C. The keeping cage 1 is formed by molding a transparent plastic. The keeping cage 1 has a bottom wall 3, a cylindrical outer wall 2 formed along the outer periphery of the bottom wall 3, and a cylindrical inner wall 4 formed around the inner periphery of the bottom wall 3 and forming a core 5 resembling an inverted cup. The outer wall 2 and the inner wall 4 define an annular keeping space 6 therebetween. A transparent lid 7 is placed on top of the keeping cage 1 to close the keeping space 6.

The observation apparatus is provided with circumferential position detectors 10, standing action detectors 11, inner peripheral position detectors 12 and outer peripheral position detectors 13. Detection signals produced by those detectors are processed by a data processing unit provided in the case C.

An upper ring 20 and a lower ring 21 are disposed coaxially around the keeping cage 1. An upper disk 22 and a lower disk 23 are disposed coaxially inside the core 5. A circular top plate 24 is disposed coaxially with and above the keeping cage 1. A circular bottom plate 25 is disposed coaxially with and below the keeping cage 1.

The circumferential position detectors 10 have light projecting elements 10a arranged in the periphery of the lower disk 23 alternately on the upper and lower sides of the same at equal angular intervals of 10°, and light receiving elements 10b arranged in the periphery of the lower ring 21 alternately on the upper and lower sides of the same so as to correspond, respectively, to the light projecting elements 10a. The standing action detectors 11 have light projecting elements 11a provided on the upper disk 22 similarly to the light projecting elements 10a of the circumferential position detectors 10, and light receiving elements 11b provided on the upper ring 20 similarly to the light receiving elements 10b of the circumferential position detectors 10.

The alternate arrangement of the detectors 10 and 11 on the upper and lower sides, respectively, of the lower disk 23 and the lower ring 21 and of the upper disk 22 and the upper ring 20 facilitates the recognition of the tail of an experimental animal M put in the cage 1 and prevents interference between the detectors. Each of the light projecting elements 10a of the circumferential position detectors 10 is disposed so as to project a light beam in parallel to the bottom wall 3. The height of the standing action detectors 11 is adjustable according to the size of the experimental animal M.

The inner peripheral position detectors 12 and the outer peripheral position detectors 13 have light projecting elements 12a and 13a arranged at equal angular intervals of 10° on the top plate 24, and light receiving elements 12b and 13b arranged at equal angular intervals of 10° on the bottom plate 25 so as to correspond to the light projecting elements 12a and 13a, respectively.

Infrared photosensors are used as the detectors to avoid unnecessary stimuli to the experimental animal M. Each of the light projecting elements is an infrared LED (light emitting element) and each of the light receiving elements is a phototransistor.

The keeping cage 1 is supported for rotation on a support shaft 9, while the detectors are stationary in the case C. Accordingly, the light projecting elements and light receiving elements of the detectors 10, 11, 12 and 13 are in alignment with each other at all times.

Detection signals produced by the 144 detectors (36×4) are scanned electrically to enable a simple data processing unit to process the detection signals through a simple operation.

Thirty-six detector sets each of the circumferential position detector 10, the standing position detector 11, the inner peripheral position detector 12 and the outer peripheral position detector 13 on the same radius are scanned electrically to obtain thirty-six sets of data for one scanning cycle, and then the thirty-six sets of data are processed by a computer to obtain data representing the three-dimensional position of the experimental animal M in one scanning cycle. Thus, the motion of the experimental animal M is determined by a plurality of pieces of data provided by the computer.

The observation of the experimental animal in such a scanning mode, in which the infrared LEDs are lighted sequentially, can be achieved by simple hardware and simple software, and requires small power.

Since the experimental animal can be thus detected at any position within the annular keeping space in the cage 1, reactions of the experimental animal to stimuli can be minutely detected and represented by data.

It is possible that the detection of the position of the experimental animal is impossible due to possible interference between the detectors by infrared rays projected from the infrared LEDs resulting from the diffusion of the infrared rays or minute misalignment of the optical axes of the detectors when the 144 detectors are driven simultaneously. However, in accordance with the present invention, the thirty-six sets of detectors each of four detectors on the same radius are driven sequentially one at a time, and hence the detecting functions of the adjacent sets of detectors are not affected by each other.

To avoid interference between the four detectors of each set, the four detectors are driven sequentially according to a timing signal, so that the phototransistor of the detector which is not driven does not produce any signal even if infrared rays fall thereon.

In this embodiment, the data processing unit has only four amplifiers each for thirty-six detectors.

The vertically zigzag arrangement of the detectors further ensures the prevention of interference between the detectors.

Although the invention has been described in its preferred form with a certain degree of particularity, obviously, many changes and variations are possible therein. It is therefore to be understood that the present invention may be practiced otherwise than as specifically described herein without departing from the spirit and scope thereof.

What is claimed is:

1. An observation apparatus for the behavioral observation of experimental animals, comprising:
    a transparent keeping cage having cylindrical outer and inner walls defining an annular keeping space therebetween;
    a plurality of circumferential position detectors arranged at equal angular intervals and each having a light projecting element and a light receiving element;
    a plurality of standing action detectors arranged at equal angular intervals and each having a light projecting element and a light receiving element;
    a plurality of inner peripheral position detectors arranged at equal angular intervals and each having a light projecting element and a light receiving element; and
    a plurality of outer peripheral position detectors arranged at equal angular intervals and each having a light projecting element and a light receiving element;
    characterized in that:
    the light projecting elements of the circumferential position detectors are arranged on a circle either outside the outer wall of the keeping cage or inside the inner wall of the keeping cage;
    the light receiving elements of a said circumferential position detectors are arranged on a circle, respectively, opposite to the corresponding light projecting elements either inside the inner wall of the keeping cage or outside the outer wall of the keeping cage;
    the light projecting elements of the standing action detectors are arranged on a circle either outside the outer wall of the keeping cage or inside the inner wall of the keeping cage;
    the light receiving elements of the standing action detectors are arranged on a circle, respectively, opposite to the corresponding light projecting elements either inside the inner wall of the keeping cage or outside the outer wall of the keeping cage;
    the light projecting elements of the inner peripheral position detectors are arranged on a circle either over or under the keeping cage;
    the light receiving elements of the inner peripheral position detectors are arranged on a circle, respectively, opposite to the corresponding light projecting elements either under or over the keeping cage;
    the light projecting elements of the outer peripheral position detectors are arranged on a circle either over or under the keeping cage; and
    the light receiving elements of the outer peripheral position detectors are arranged on a circle, respectively, opposite to the corresponding light projecting elements either under or over the keeping cage.

2. An observation apparatus according to claim 1, wherein the circumferential position detectors are arranged alternately on the upper side and lower side of a horizontal plane in a vertically zigzag arrangement, and the standing action detectors are arranged alternately on the upper side and lower side of a horizontal plane in a vertically zigzag arrangement.

* * * * *